(12) United States Patent
Roll et al.

(10) Patent No.: US 7,669,877 B2
(45) Date of Patent: *Mar. 2, 2010

(54) TRAILER COUPLER ASSEMBLY

(75) Inventors: Michael J. Roll, West Bend, WI (US); Todd R. Walstrom, Weston, WI (US); Todd Trowbridge, Marathon, WI (US)

(73) Assignee: Cequent Trailer Products, Inc., Mosinee, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/221,102

(22) Filed: Jul. 31, 2008

(65) Prior Publication Data

US 2009/0072518 A1  Mar. 19, 2009

Related U.S. Application Data

(63) Continuation of application No. 11/086,777, filed on Mar. 22, 2005, now Pat. No. 7,410,184, which is a continuation-in-part of application No. 10/687,168, filed on Oct. 16, 2003, now Pat. No. 6,869,095.

(60) Provisional application No. 60/418,695, filed on Oct. 16, 2002.

(51) Int. Cl.
*B60D 1/155* (2006.01)

(52) U.S. Cl. ................................. 280/491.3; 280/491.1

(58) Field of Classification Search ............. 280/491.3, 280/491.1
See application file for complete search history.

(56) References Cited

U.S. PATENT DOCUMENTS

| | | | |
|---|---|---|---|
| 1,949,962 A | 3/1934 | Hess | |
| 2,844,389 A | 7/1958 | Burnett | |
| 2,918,310 A | 12/1959 | Carson | |
| 3,740,078 A | 6/1973 | Murr | |
| 4,073,508 A * | 2/1978 | George et al. | ............ 280/478.1 |
| 4,162,798 A | 7/1979 | Foley | |
| 4,398,742 A | 8/1983 | Sanders | |
| 5,011,176 A | 4/1991 | Eppinette | |
| 5,147,095 A | 9/1992 | Duncan | |

(Continued)

FOREIGN PATENT DOCUMENTS

DE  1 265 590  4/1968

OTHER PUBLICATIONS

Going to Extremes, article published in the May 2002 issue of Hot Boat Magazine (pivoting hitch photograph) pp. 106-111.

*Primary Examiner*—Lesley Morris
*Assistant Examiner*—Michael R Stabley
(74) *Attorney, Agent, or Firm*—McDonald Hopkins LLC (57) ABSTRACT

A trailer coupler pivot assembly comprising a pivot mount member connected to a trailer frame member and a hinge bracket connected to a trailer tongue arm. The hinge bracket is pivotally connected to the pivot mount member so that the trailer tongue arm is pivotal relative to the trailer frame member between an open position and a closed position. However, either of the pivot mount member or the hinge bracket comprises a single, prefabricated component to make assembly more efficient and cost effective. With both the pivot mount member and the hinge bracket being single, prefabricate components, the trailer coupler pivot assembly can be more easily installed with fewer components and welds and by less skilled labor.

20 Claims, 5 Drawing Sheets

U.S. PATENT DOCUMENTS

| | | |
|---|---|---|
| 5,226,657 A | 7/1993 | Dolphin |
| 5,308,100 A | 5/1994 | Heider et al. |
| 5,503,423 A | 4/1996 | Roberts et al. |
| 5,624,129 A | 4/1997 | Clark, Jr. |
| 5,890,617 A | 4/1999 | Rowland et al. |
| 5,992,871 A | 11/1999 | Rowland et al. |
| 6,116,633 A | 9/2000 | Pride |
| 6,364,337 B1 * | 4/2002 | Rowland et al. ......... 280/491.3 |
| 6,460,870 B2 | 10/2002 | Moss |
| 6,527,292 B2 | 3/2003 | Adair |
| 6,595,540 B1 * | 7/2003 | MacKarvich ............ 280/491.3 |
| 6,746,037 B1 | 6/2004 | Kaplenski et al. |
| D498,715 S | 11/2004 | Smith et al. |
| 6,869,095 B2 | 3/2005 | Roll et al. |
| D509,776 S | 9/2005 | Stettler |
| 7,021,645 B1 * | 4/2006 | Stettler .................... 280/491.4 |
| 7,237,791 B1 * | 7/2007 | Stettler ....................... 280/482 |
| D554,029 S | 10/2007 | Roll et al. |
| 7,410,184 B2 | 8/2008 | Roll et al. |
| 2003/0127827 A1 | 7/2003 | Hulsey et al. |
| 2003/0141698 A1 | 7/2003 | MacKarvich |
| 2005/0218627 A1 * | 10/2005 | Rowland ................. 280/491.1 |
| 2006/0131836 A1 | 6/2006 | Rowland et al. |
| 2007/0241537 A1 | 10/2007 | Stettler |

* cited by examiner

TRAILER COUPLER ASSEMBLY

CROSS-REFERENCE TO RELATED APPLICATIONS

This is a Continuation of U.S. patent application Ser. No. 11/086,777, filed Mar. 22, 2005, now U.S. Pat. No. 7,410,184 and entitled Trailer Coupler Assembly, which is a Continuation-In-Part application of U.S. patent application Ser. No. 10/687,168 filed Oct. 16, 2003, now U.S. Pat. No. 6,869,095 and entitled Trailer Coupler Assembly, which claims priority from U.S. Provisional Patent Application No. 60/418,695 filed on Oct. 16, 2002, and entitled Trailer Coupler Assembly, all of which are hereby incorporated by reference herein.

BACKGROUND

Trailered objects are typically stored on the trailers that carry them. For example, a boat can generally be stored within a typical garage while on the trailer used to tow the boat. A typical boat, which is 18 feet in length, supported by a typical trailer requires storage space of approximately 24 feet measured from the most rearward point of the boat's stern to the most forward element of the trailer, that being the trailer coupler. The average inside length of a garage is approximately 24 feet or less, which creates a condition where the boat and trailer combination will not quite fit in the garage. Forcing the boat and trailer combination to fit into such garages can cause damage to the garage, the trailer, and the boat.

The prior art discloses a solution to such a tight-fitting storage condition where a pre-determined portion of the trailer tongue or coupler is allowed to pivot or fold back upon itself to reduce the overall length of the trailer. Therefore, the trailer-boat combination may better fit into a garage of standard length. Such pivoting trailer coupler designs are well known and can be seen in the market place today. Several examples of these designs are shown in U.S. Pat. Nos. 4,398,742; 5,503,423; 5,890,617; and 6,364,337, which are enclosed and herewith incorporated by reference herein.

The prior art pivoting trailer coupler designs indicated above illustrate the complexity of design, which is the current state of the art. Particularly, the prior art predominately uses a "sandwich" design having overlapping plates and tubes that extend vertically over the trailer beam. However, as described, the manufacture and installation of such designs must be handled by skilled and experienced laborers to ensure proper orientation of the numerous components and to ensure proper pivot and engagement.

The present invention provides significant benefits to the trailer manufacturer. The prior art designs require great skill and precision to weld several loose components to a structure that is not straight, does not have parallel surfaces, and is generally not an accurately defined foundation. Further, the prior art components conduct a large amount of heat generated from the welding process that can relieve internal stresses causing the finished weldment to deviate from its planned locations. This can cause a misalignment and binding of components.

SUMMARY OF THE INVENTION

It is an object of the present invention to provide an improved trailer coupler assembly that is easier to manufacture.

It is a further object of the present invention to provide a trailer coupler assembly having a pivot assembly that is simpler and more cost effective to manufacture and install.

The objects of the present invention are satisfied by providing a trailer coupler pivot assembly comprising a pivot mount member connected to a trailer frame member and a hinge bracket connected to a trailer tongue arm. The hinge bracket is pivotally connected to the pivot mount member so that the trailer tongue arm is pivotal relative to the trailer frame member between an open position and a closed position. However, either of the pivot mount member or the hinge bracket comprises a single, prefabricated component to make assembly more efficient and cost effective. With both the pivot mount member and the hinge bracket being single, prefabricate components, the trailer coupler pivot assembly can be more easily installed with fewer components and welds and by less skilled labor.

BRIEF DESCRIPTION OF THE SEVERAL VIEWS OF THE DRAWING

Objects and advantages together with the operation of the invention may be better understood by reference to the detailed description taken in connection with the following illustrations, wherein.

DETAILED DESCRIPTION OF THE INVENTION

It should be noted that while the present invention is described for use with a surge brake actuator coupler, the present invention may be used with any type trailer coupler and is not limited by the description herein.

The present invention provides for a trailer coupler pivot assembly comprising a pivot mount member connected to the trailer and a hinge bracket connected to the coupler wherein the hinge bracket is pivotally connected to the pivot mount member so that the coupler can be pivoted away from the trailer to decrease the overall length of the trailer.

Figure 1:
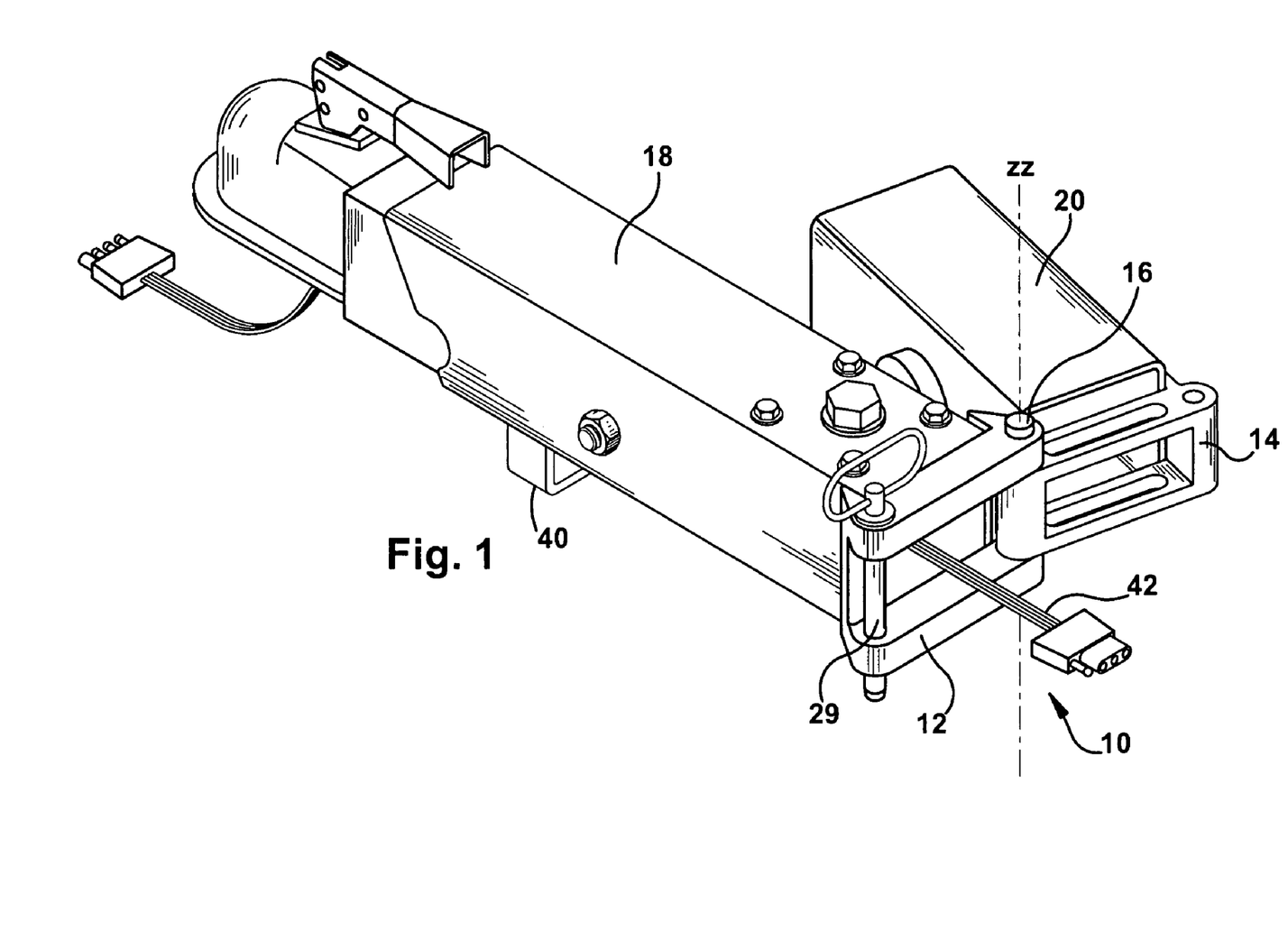
FIG. 1 is a perspective view of the trailer coupler assembly of the present invention where the surge brake actuator coupler is pivoted to an open position.

With reference now to the drawings, FIG. 1 shows a trailer coupler pivot assembly 10 comprising a hinge bracket 12 pivotally connected to a pivot mount member 14 by pivot pin 16 so as to define pivotal axis zz. For ease of manufacture and construction, both the hinge bracket 12 and the pivot mount member 14 are preferably single members connected to the coupler and trailer respectively. Preferably, both the hinge bracket 12 and the pivot mount member 14 are made from cast metal, such as steel, metal powder, or other suitable material. And while it is preferred that axis zz be vertical or substantially vertical so that the coupler swings open through a horizontal plane, other axis angles may be utilized and still perform the desired operation.

Figures 2, 3:
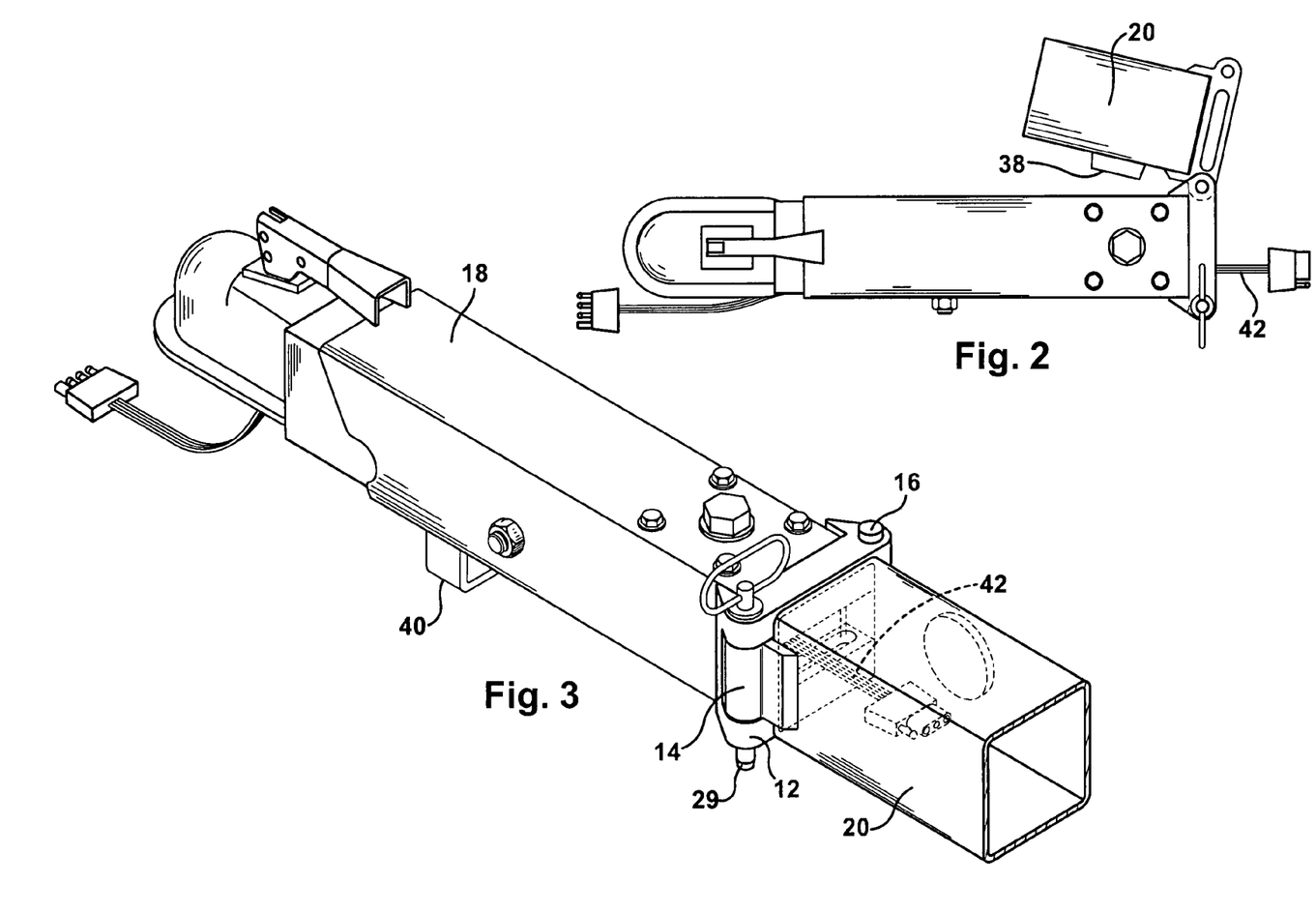
FIG. 2 is a top view of the trailer coupler assembly shown in FIG. 1.
FIG. 3 is a perspective view of the trailer coupler assembly where the surge brake actuator coupler is held in a closed position.
Figure 6:
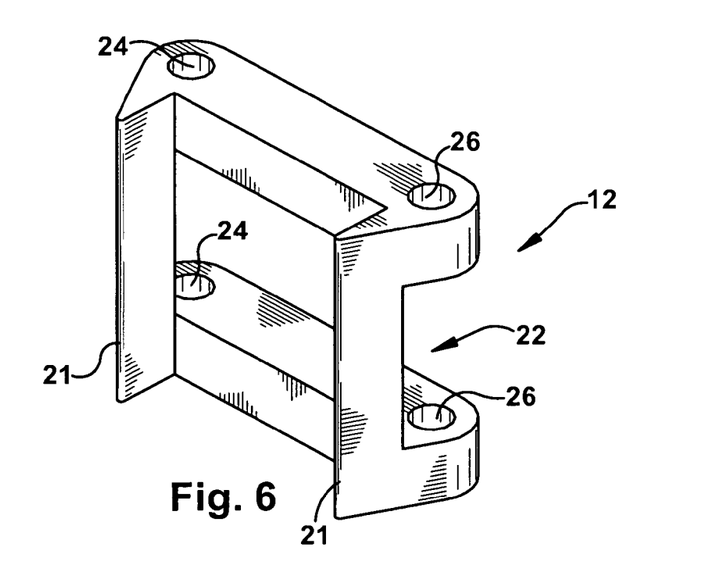
FIG. 6 is a perspective view of the hinge bracket.

As best shown in FIG. 6, hinge bracket 12 comprises a single metal cast member having a pair of confronting welding flanges 21 capable of being welded to coupler 18. Hinge bracket 12 further includes two pairs of mutually opposed bores having a pivot mount receiving portion 22 located therebetween. Hinge bracket 12 includes bores 24 that partially define axis zz and bores 26 designed to receive removable locking hinge pin 29 as further described below. Pivot mount receiving portion 22 is configured so that pivot mount member 14 may be pivotally connected to hinge bracket 12 and be pivotally received within hinge bracket 12 when the pivot assembly is in a closed position as shown in FIG. 3.

Figure 5:
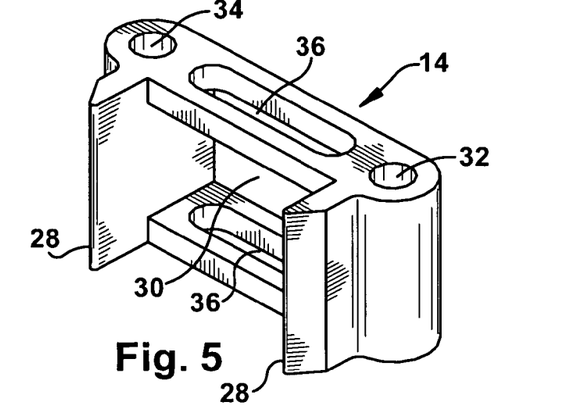
FIG. 5 is a perspective view of the pivot mount.

As best shown in FIG. 5, pivot mount member 14 comprises a single metal cast member having a pair of confronting welding flanges 28 capable of being welded to trailer beam 20. Pivot mount member 14 further includes an aperture 30 therethrough so as to provide access to the interior of trailer beam 20, where wiring or other components are stored, when pivot mount member 14 is connected to trailer beam 20. Pivot mount member 14 further includes bore 32 for pivotally connecting pivot mount member 14 to hinge bracket 12 and partially defining axis zz and bore 34 capable of receiving hinge pin 29. Pivot mount member 14 is configured to be pivotally received with the pivot mount-receiving portion 22 of hinge bracket 12 when the pivot assembly is in a closed position as shown in FIG. 3.

Figure 8:
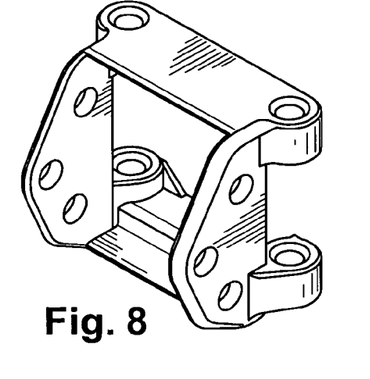
FIG. 8 is a perspective view of the pivot mount according to an alternative embodiment.
Figure 9:
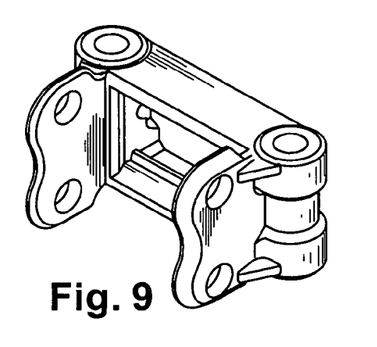
FIG. 9 is a perspective view of the hinge bracket according to an alternative embodiment.
Figure 10:
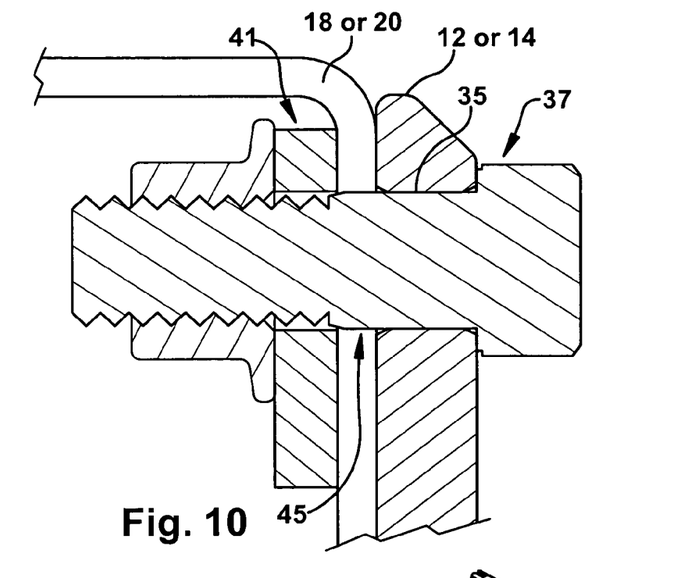
FIG. 10 is a cross-sectional view of the alternative embodiment.
Figure 11:
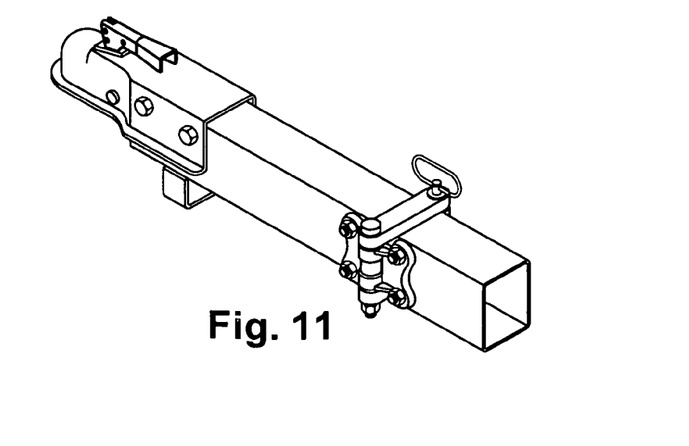
FIG. 11 is a perspective view of the trailer coupler assembly according to the alternative embodiment.

In an alternative embodiment, the hinge bracket 12 and pivot mount member 14 may also be connected by bolts. As shown in FIG. 8, the hinge bracket 12 may include a pair of confronting connecting flanges 33 having apertures 35 which are capable of connecting the hinge bracket 12 to the coupler 18 other than by welding, e.g. by bolts. As shown in FIG. 9, pivot mount member 14 may include a pair of confronting connecting flanges 33 having apertures 35 which are capable of connecting the pivot mount member 14 to trailer beam 20 other than by welding, e.g. by bolts. As shown in FIGS. 10 and 11, the bolt apertures 35 are aligned with apertures 45 in the coupler or trailer beam to connect the hinge bracket 12 and the pivot mount member 14 to the coupler 18 and trailer beam 20 respectively. And while traditional bolts could be utilized, it is preferably that large shank bolts 37 are used to extrude thru the apertures 35, 45 so as to provide a zero-clearance fit and eliminate the movement of the bolts 37 under a load. Special reinforcing plates 41 add additional strength to the design that allows smaller gauge tubing to be used. Such bolt-on, foldaway, pivot assemblies eliminate the need for welding and repainting after welding. Thus, the bolt on design allows fold away pivots to be retro-fitted to an existing trailer without re-painting.

The pivot mount member 14 and the hinge bracket 12 have relatively little running clearance between the bores and pivot pin 16. This minimizes the potential for rust bonding of the two components. To prevent this situation from happening, a grease zerk 36 is formed in the center of the pivot mount member 14 on both sides such that the end user can apply grease to the components during storage times, yet while towing or parking, the grease zerks are hidden inside the pivot assembly. The grease zerks are installed on both sides so that the end user can determine which way they want the tongue of the trailer to pivot by interchanging the positions of the pivot fastener and the lock pin.

In construction, pivot mount member 14 is connected to the trailer frame (not shown) by any suitable means. Preferably, pivot mount member 14 is welded to trailer beam 20. However, other connection means may be utilized to connect pivot mount member 14 to the trailer frame. Likewise, hinge bracket 12 is connected to coupler 18 by any suitable means. Preferably, hinge bracket 12 is welded to the coupler 18 (herein the brake actuator coupler cover). However, other connection means may be utilized to connect the hinge bracket 12 to the coupler 18.

Pivot mount member 14 is pivotally connected to hinge bracket 12 by pivot pin 16 which can be a typical threaded bolt. Therefore, the coupler 18 can pivot about axis zz from an open position shown in FIG. 1 to a closed position shown in FIG. 3. When in a closed position, hinge bracket 12 is pivoted about axis zz and receives pivot mount member 14 within pivot mount receiving portion 22. When pivot mount member 14 is fully nested within pivot mount receiving portion 22, bores 26 and bore 34 align so that removable hinge pin 29 can be inserted therethrough to maintain the connection and prevent further axial movement. Removable hinge pin 29 may also include a self-locking member so that the hinge pin 29 cannot be accidentally removed from the bores 26 and bore 34. In order to pivot the coupler 18 about axis zz, hinge pin 29 can be removed from hinge bracket bores 26 and pivot mount member bore 34, thereby permitting the coupler to swing about axis zz to the side of trailer beam 20.

As best shown in FIG. 2, there is a planned interference between the pivot mount member 14 and the hinge bracket 12 when the coupler assembly is pivoted to the open position. A pre-determined minimum clearance is established between the couple 18 (or herein the actuator cover) and the trailer beam 20. The planned interference, or pivot stop 38, prevents the accidental breakage of equipment such as clearance lights that may be mounted to the sides of the trailer beam 20.

The prior art shows coupler pivot assemblies where a plate and tube sandwich construction where an upper and lower plate is welded to a trailer beam and two vertical sleeves are welded to the sides of the actuator housing. Based on the relative flatness of the two plates, required alignment of both plates to each other and the orientation of the two vertical sleeves in three axes all in relationship to one another, the sandwich design becomes a difficult fabrication process to control.

The present invention does not have these inherent fabrication difficulties. Each bore of the pivot mount and hinge bracket is established in three axes and relative to themselves through the casting and boring process. This eliminates the need for precision alignment of upper and lower plates and vertical sleeves. To further ease the fabrication process, the hinge bracket and pivot mounts have shapes cast into them that provide self-locating datums to the trailer beam and actuator cover. It is also obvious that this design can allow for differing trailer beam shapes through minor changes to the pivot mount and hinge bracket castings. This allows the trailer manufacturer to crudely place the pivot mount on the trailer beam and weld without the necessary precision as required with prior art.

Safety chains are also an important safety feature for any trailer. With pivoting tongue trailers, manufacturers typically opt to anchor the safety chains to the trailer beam rather than the pivoting portion of the tongue. As a result, these safety chains can be rather long and may sag to the point that they may drag on the pavement during towing. To alleviate this condition, the present invention also provides for a chain retainer 40 attached to the pivoting coupler 18.

Figure 7:
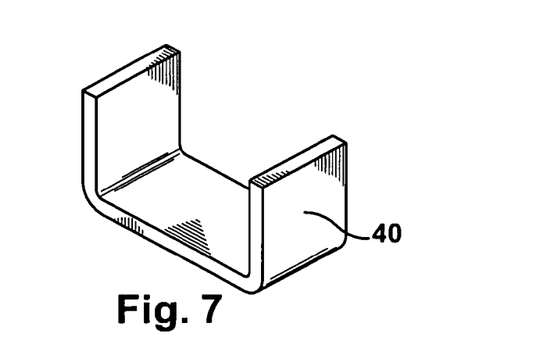
FIG. 7 is a perspective view of the chain retainer before being mounted to the coupler.

As best shown in FIG. 7, chain retainer 40 is a U-shaped member connected to the coupler 18 (herein the brake actuator coupler cover) and extending below thereof. The chain retainer 40 has a horizontal member of sufficient length to prevent the links of the safety chain (not shown) from catching on the edges of the chain retainer. The overall inside height of the chain retainer 40 is set to allow for the possibility of the chains doubling up and thereby permitting the safety chains to slide freely on the chain retainer which is expected during normal towing events such as cornering.

Trailer manufacturers also typically exit the wiring harness, which routes the electrical signals from the towing vehicle to the trailer, out of the trailer beam prior to the pivot mechanism. This is done largely because most couplers or brake actuator couplers on the market do not have enough room inside them to route the harness therethrough. Therefore, this results in very long wiring harnesses that can drag on the pavement during towing or be in the way during storage.

The present invention addresses these problems by routing the wiring harness 42 through the interior of the coupler 18. As best shown in FIG. 1, the wiring harness 42 extends through the coupler body and exits out the front and rear of the coupler body. With the wiring harness 42 routed through the coupler body, it is now protected from unwanted road abrasion due to dragging and accidental damage during storage. The wiring harness 42 can be attached to the existing wiring harness (not shown) provided by the trailer manufacturer which exists the trailer beam.

Figure 4:
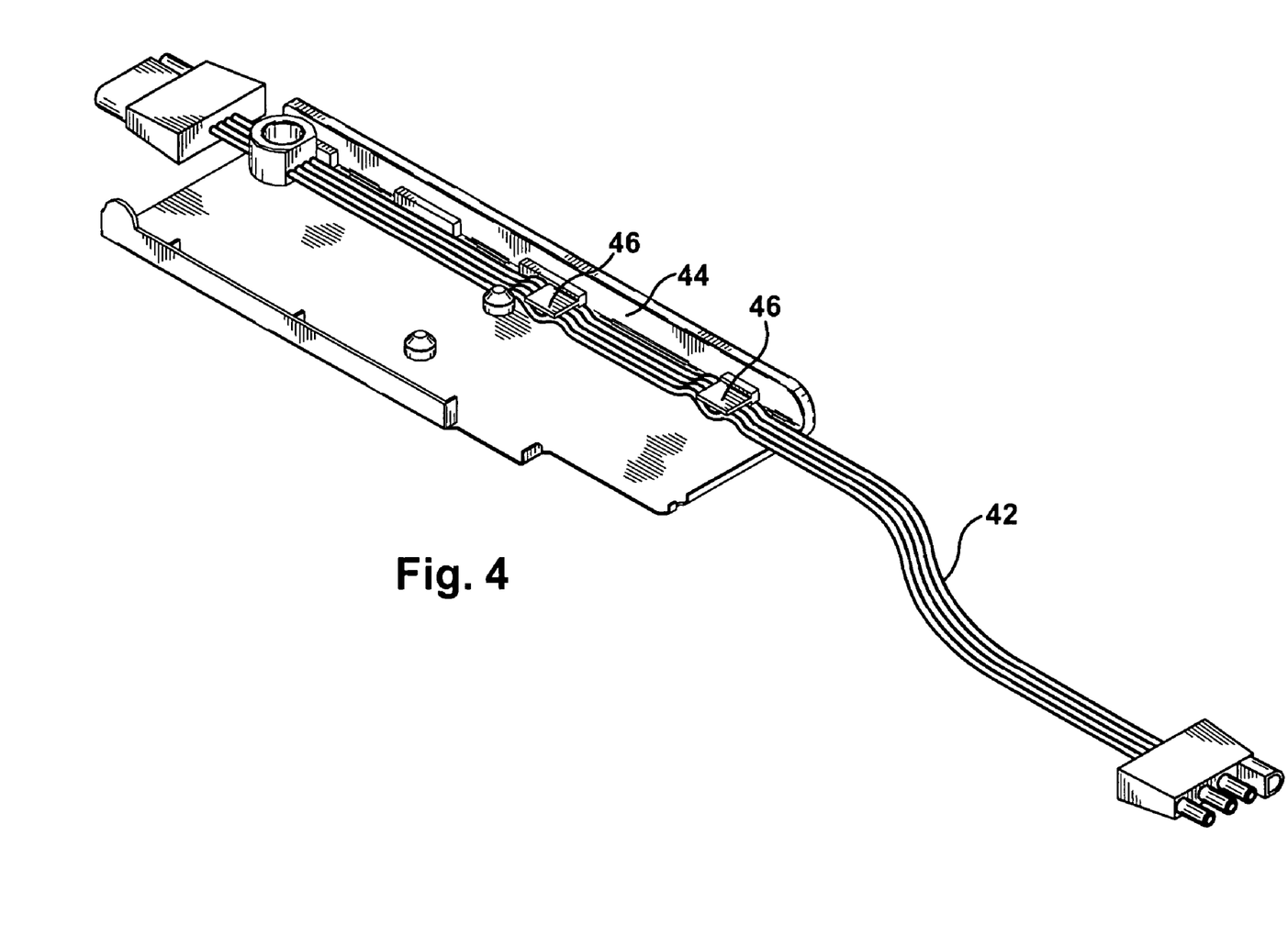
FIG. 4 is a perspective view of a bottom coupler slide plate having the wiring harness secured thereto.

It is presently preferred that the wiring harness 42, as best shown in FIG. 4, is attached to the lower slide plate 44 of the surge brake actuator coupler by a series of routing hooks 46 molded to the lower slide plate 44. The wiring harness 42 is secured to the lower slide plate 44 to limit the position of the wiring harness 42 relative to the internal components of the surge brake actuator coupler and provide strain relief. However, it is also contemplated that the wiring harness can be secured to the interior of a traditional coupler.

The invention has been described with reference to the preferred embodiment. Obviously, modifications and alternations will occur to others upon a reading and understanding of this specification. The claims as follows are intended to include all modifications and alterations insofar as they come within the scope of the claims or the equivalent thereof.

Having thus described the invention, we claim:

1. A trailer coupler pivot assembly comprising:
   a trailer frame mount member comprising a single prefabricated component, the trailer frame mount member including:
   a first body;
   a first bore passing through the first body;
   a second bore passing through the first body; and
   a first flange member extending from the first body for securing the trailer frame mount member to a trailer frame;
   a trailer tongue mount member comprising a single prefabricated component, the trailer tongue mount member including:
   a second body;
   a third bore passing through the second body;
   a fourth bore passing through the second body; and
   a second flange member extending from the second body for securing the trailer tongue mount member to a trailer tongue; and
   a connector passing through the first bore and the third bore to pivotally connect the trailer frame mount member and the trailer tongue mount member.

2. The trailer coupler pivot assembly of claim 1, where the first flange member includes a mounting aperture for alignment with a corresponding aperture in the trailer frame to secure the trailer frame mount member to the trailer frame via bolts.

3. The trailer coupler pivot assembly of claim 2, where the bolts include shanks that are larger in diameter than diameters of the apertures.

4. The trailer coupler pivot assembly of claim 3, where the trailer frame mount member includes a third flange member extending from the first body.

5. The trailer coupler pivot assembly of claim 1, where the second flange member includes a mounting aperture for alignment with a corresponding aperture in the trailer tongue secure the trailer tongue mount member to the trailer tongue via bolts.

6. The trailer coupler pivot assembly of claim 5, where the bolts include shanks that are larger in diameter than diameters of the apertures.

7. The trailer coupler pivot assembly of claim 6, where the trailer tongue mount member includes a fourth flange member extending from the second body.

8. The trailer coupler pivot assembly of claim 1, where the trailer frame mount member is manufactured form cast metal.

9. The trailer coupler pivot assembly of claim 1, where the trailer tongue mount member is manufactured from cast metal.

10. The trailer coupler pivot assembly of claim 1, where the trailer frame mount member is manufactured from powdered metal.

11. The trailer coupler pivot assembly of claim 1, where the trailer tongue mount member is manufactured from powdered metal.

12. The trailer coupler pivot assembly of claim 1, where the trailer frame mount member is pivotally connected to the trailer tongue mount member along a substantially vertical axis so that the trailer tongue pivots relative to the trailer frame between an open position and a closed position through a substantially horizontal plane.

13. A trailer coupler pivot assembly comprising:
    a trailer frame;
    a coupler tongue;
    a single prefabricated trailer mount member including a first extending flange for mounting the trailer frame mount member to the trailer frame;
    a single prefabricated coupler tongue mount member including a second extending flange for mounting the coupler tongue mount member to the coupler tongue; and
    a connector for pivotally connecting the trailer frame mount member and the trailer tongue mount member so that the trailer tongue is pivotal relative to the trailer frame between an open position and a closed position.

14. The trailer coupler pivot assembly of claim 13, where the coupler tongue mount member further comprises a pair of integral support members having a pivot mount receiving portion.

15. The trailer coupler pivot assembly of claim 14, where the coupler tongue mount member includes a third extending flange confronting the second extending flange.

16. The trailer coupler pivot assembly of claim 15, where the support members are vertically oriented relative to each other and where each of the support member includes a pair of opposed bores, where the bores of each support members are vertically aligned with the corresponding bores of the other support members so as to define a pivot axis and a lock axis.

17. The trailer coupler pivot assembly of claim 16, where the trailer frame mount member further comprises a pair of integral sleeve portions configured to be pivotally received with the pivot mount receiving portion of the trailer tongue mounting member when the pivot assembly is in the closed position.

18. The trailer coupler assembly of claim 17, where the sleeve portions are horizontally oriented relative to each other and where each of the sleeve portions include a vertical bore, where one vertical bore is vertically aligned between corresponding bores in the support members to further define the pivot axis.

19. The trailer coupler pivot assembly of claim 18, where the other vertical bore of the other sleeve section is vertically aligned between the other corresponding bores in the support members when the coupler tongue is pivoted to the closed position to define a pin-receiving bore alignment for preventing pivot movement of the coupler tongue.

20. The trailer coupler pivot assembly of claim 19, where a removable pin is capable of insertion through the pin-receiving bore alignment when the coupler tongue is rotated to the closed position.

* * * * *

UNITED STATES PATENT AND TRADEMARK OFFICE
CERTIFICATE OF CORRECTION

| | | |
|---|---|---|
| PATENT NO. | : 7,669,877 B2 | Page 1 of 1 |
| APPLICATION NO. | : 12/221102 | |
| DATED | : March 2, 2010 | |
| INVENTOR(S) | : Michael J. Roll et al. | |

It is certified that error appears in the above-identified patent and that said Letters Patent is hereby corrected as shown below:

Column 6, line 9, delete "tongue secure" and insert --tongue to secure--

Column 6, line 61, delete "members" and insert --member--

Signed and Sealed this
Nineteenth Day of April, 2011

David J. Kappos
*Director of the United States Patent and Trademark Office*